(12) United States Patent
Amm

(10) Patent No.: US 7,573,631 B1
(45) Date of Patent: Aug. 11, 2009

(54) HYBRID ANALOG/DIGITAL SPATIAL LIGHT MODULATOR

(75) Inventor: David T. Amm, Sunnyvale, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 11/352,763

(22) Filed: Feb. 13, 2006

Related U.S. Application Data

(60) Provisional application No. 60/655,680, filed on Feb. 22, 2005.

(51) Int. Cl.
*G02F 1/03* (2006.01)
*G02B 26/00* (2006.01)

(52) U.S. Cl. .................... 359/245; 359/290

(58) Field of Classification Search ......... 359/230–231, 359/237–238, 240, 245, 247, 267, 290–291, 359/298, 649
See application file for complete search history.

(56) References Cited

U.S. PATENT DOCUMENTS

| | | | |
|---|---|---|---|
| 5,311,360 A * | 5/1994 | Bloom et al. ............... | 359/572 |
| 5,381,236 A | 1/1995 | Morgan | |
| 5,677,783 A * | 10/1997 | Bloom et al. ............... | 359/224 |
| 5,777,736 A | 7/1998 | Horton | |
| 6,215,579 B1 * | 4/2001 | Bloom et al. ............... | 359/298 |
| 6,229,650 B1 | 5/2001 | Reznichenko et al. | |
| 6,342,960 B1 | 1/2002 | McCullough | |
| 6,377,293 B2 | 4/2002 | Koh et al. | |
| 6,479,811 B1 | 11/2002 | Kruschwitz et al. | |
| 6,528,887 B2 * | 3/2003 | Daneman et al. ............ | 257/774 |
| 6,552,855 B1 | 4/2003 | Kowarz et al. | |
| 6,636,339 B2 | 10/2003 | Lee | |
| 6,661,561 B2 * | 12/2003 | Fitzpatrick et al. .......... | 359/291 |
| 6,717,714 B1 | 4/2004 | Kowarz et al. | |
| 6,844,960 B2 | 1/2005 | Kowarz | |
| 6,856,449 B2 * | 2/2005 | Winkler et al. ............... | 359/298 |
| 6,919,983 B2 * | 7/2005 | Kowarz ....................... | 359/290 |
| 6,967,986 B2 | 11/2005 | Kowarz et al. | |

(Continued)

OTHER PUBLICATIONS

D.T. Amm, et al. "Grating Light Valve Technology: Update and Novel Applications" May 19, 1998, pp. 1-4, Silicon Light Machines. Presented at Society for Information Display Symposium, Anaheim, CA.

(Continued)

*Primary Examiner*—Scott J Sugarman
*Assistant Examiner*—Dawayne A Pinkney
(74) *Attorney, Agent, or Firm*—William E. Nuttle

(57) ABSTRACT

One embodiment relates to a hybrid micro electromechanical systems (MEMS) based spatial light modulator (SLM) capable of operating in both analog and digital modes. The hybrid SLM includes a substrate having an upper surface, a number of movable ribbons disposed a predetermined distance above the upper surface of the substrate, the ribbons having light reflective surfaces formed on their upper side facing away from the upper surface of the substrate, and a number of standoffs having a predetermined height positioned between a lower surface of the movable ribbons and the upper surface of the substrate. The standoffs are configured to limit the ribbon deflection of movable ribbons toward the upper surface of the substrate when the SLM is operated in digital mode with snap-down voltages applied between the ribbon and drive electronics in the substrate. Other embodiments are also disclosed.

14 Claims, 7 Drawing Sheets

U.S. PATENT DOCUMENTS

| | | | |
|---|---|---|---|
| 7,102,808 B2 * | 9/2006 | Kasai | 359/290 |
| 2003/0058514 A1 * | 3/2003 | Kruschwitz et al. | 359/230 |
| 2005/0184947 A1 * | 8/2005 | Maeyama et al. | 345/94 |
| 2006/0024919 A1 * | 2/2006 | Yang | 438/460 |

OTHER PUBLICATIONS

David T. Amm, et al. "Optical Performance of the Grating Light Valve Technology" 1999, pp. 1-8, Silicon Light Machines, Sunnyvale, California.

R.W. Corrigan, "An Alternative Architecture for High Performance Display" Nov. 20, 1999, pp. 1-5, Silicon Light Machines. Presented at SMPTE Technical Conference and Exhibition, New York, NY.

R.W. Corrigan, et al. "Calibration of a Scanned Linear Grating Light Valve Projection System" May 18, 1999, pp. 1-4, Silicon Light Machines. Presented at Society for Information Display Symposium, San Jose, CA.

D.M. Bloom "The Grating Light Valve: revolutionizing display technology" pp. 1-10, Silicon Light Machines (formerly Echelle, Inc.), Sunnyvale, California.

* cited by examiner

HYBRID ANALOG/DIGITAL SPATIAL LIGHT MODULATOR

CROSS-REFERENCE TO RELATED APPLICATIONS

The present application claims the benefit of U.S. Provisional Patent Application No. 60/655,680, entitled "Hybrid Analog/Digital Grating Light Valve," filed Feb. 22, 2005, by inventor David T. Amm.

TECHNICAL FIELD

The present invention is directed generally to spatial light modulators, and more particularly, but not exclusively to, micro electromechanical systems (MEMS) based spatial light modulators.

BACKGROUND OF THE INVENTION

Spatial light modulators (SLMs) are devices or arrays of one or more devices that can control or modulate an incident beam of light in a spatial pattern that corresponds to an electrical input to the devices. The incident light beam can be modulated in intensity, phase, polarization or direction. Some modulation can be accomplished through the use of micro electromechanical systems (MEMS) in which electrical signals move micromechanical structures to modulate light incident thereon.

One type of MEMs based SLM is a ribbon light modulator, such as a Grating Light Valve (GLV™) commercially available from Silicon Light Machines, Inc., of Sunnyvale, Calif. Referring to FIG. 1, a ribbon light modulator generally includes a number of ribbons 102 each having a light reflective surface supported over a reflective surface of a substrate 104. One or more of the ribbons are deflectable toward the substrate to form an addressable diffraction grating with adjustable diffraction strength. The ribbons 102 may be electrostatically deflected towards the substrate 104 by integrated drive electronics formed in or on the surface of the substrate. Light reflected from the movable ribbons adds as vectors of magnitude and phase with that reflected from stationary ribbons or a reflective surface beneath the ribbons, thereby modulating light reflected from the SLM.

SUMMARY

One embodiment of the invention relates to a hybrid micro electromechanical systems (MEMS) based spatial light modulator (SLM) capable of operating in both analog and digital modes. The hybrid SLM includes a substrate having an upper surface, a number of movable ribbons disposed a predetermined distance above the upper surface of the substrate, the ribbons having light reflective surfaces formed on their upper side facing away from the upper surface of the substrate, and a number of standoffs having a predetermined height positioned between a lower surface of the movable ribbons and the upper surface of the substrate. The standoffs are configured to limit the ribbon deflection of movable ribbons toward the upper surface of the substrate when the SLM is operated in digital mode with snap-down voltages applied between the ribbon and drive electronics in the substrate.

Another embodiment relates to a method of operating a micro electromechanical systems (MEMS) based spatial light modulator (SLM). Determinations are made (a) of a corrected level is determined for an intensity of reflected light by a pixel of the MEMS-based SLM when the pixel is in an ON state and (b) of an analog voltage to apply between movable ribbons of the pixel and a substrate thereunder such that the movable ribbons are deflected from an undeflected state by an analog distance so as to reduce the intensity of the reflected light by the pixel to the corrected level. The pixel is controllably set in the ON state by applying the analog voltage between the movable ribbons and the substrate. The pixel is controllably set in an OFF state by applying a snap-down voltage between the movable ribbons and the substrate thereunder. Applying the snap-down voltage deflects a top surface of the movable ribbons to a predetermined height above a top surface of the substrate.

A micro electromechanical systems (MEMS) based spatial light modulator (SLM) including at least the following. Circuitry is configured to controllably set the pixel in the ON state by applying an analog voltage between the movable ribbons and the substrate such that the movable ribbons are deflected from an undeflected state so as to reduce the intensity of the reflected light by the pixel to a corrected level. In addition, circuitry is configured to controllably set the pixel in an OFF state by applying a snap-down voltage between the movable ribbons and the substrate thereunder. Applying the snap-down voltage deflects a top surface of the movable ribbons to a predetermined height above a top surface of the substrate.

Other embodiments are also disclosed.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

Conventional MEMS-Based Spatial Light Modulators

Figure 1:
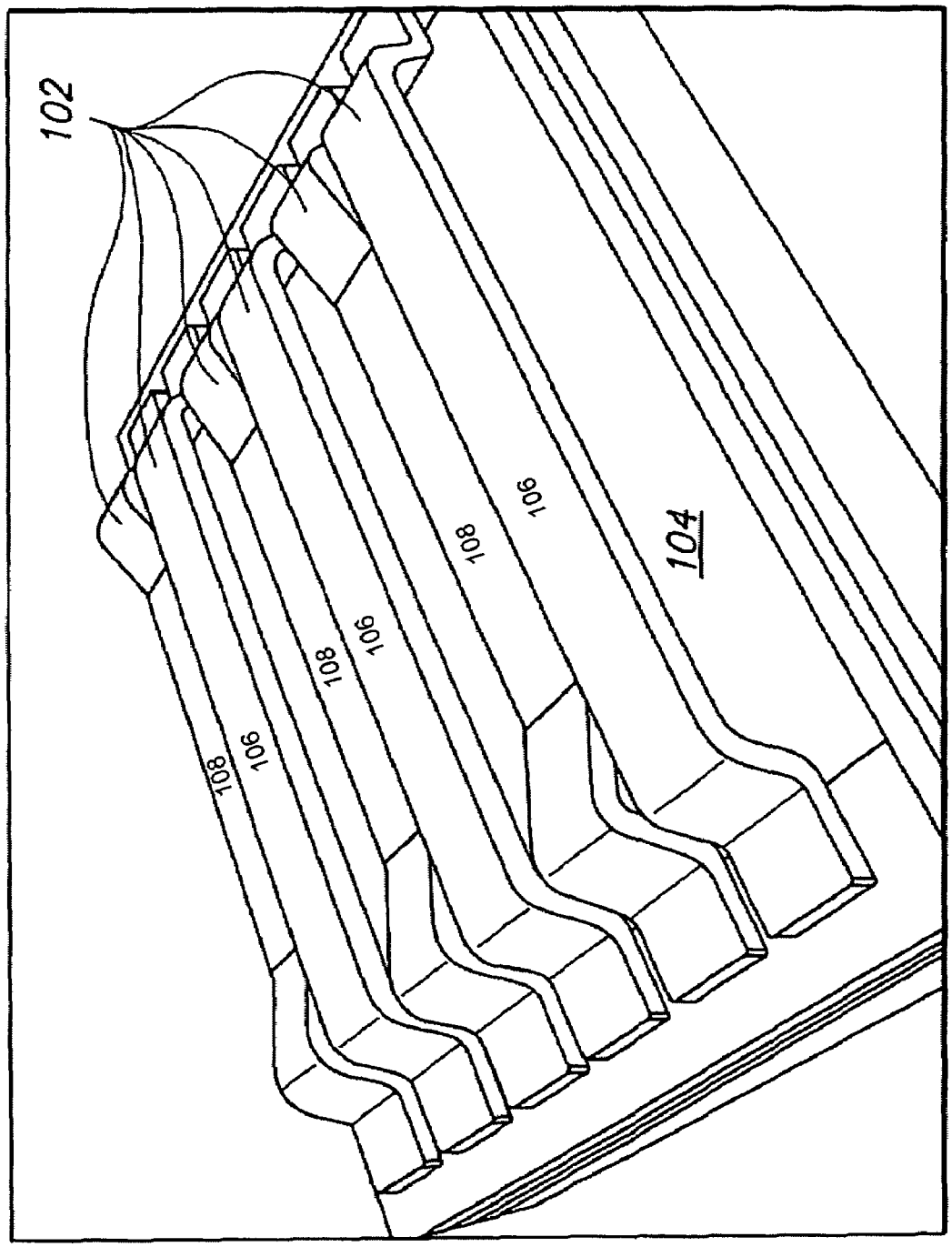
FIG. 1 is a perspective view of a conventional ribbon type spatial light modulator (SLM)

Ribbon light modulators can be employed in various applications including displays, optical networks, and printing. Generally, MEMS-based SLMs are either analog or digital modulators.

Digital modulators operate in a "contact" or snap-down mode in which the electrostatic attraction causes the ribbon to snap down and contact the substrate. The ribbon typically snaps down to the substrate if the deflection exceeds one third the distance between the ribbon and the substrate surface.

Analog modulators operate in the non-contact mode at deflections less than the snap-down voltage, and thus has the capability of continuous (or "analog") intensity modulation. However, analog modulators generally are made using a thick sacrificial layer to provide the necessary distance between the ribbon and the substrate surface. This requirement of a thick sacrificial layer reduces ribbon damping and power handling characteristics of the analog modulator. This results in slower switching speeds.

In contrast, digital modulators operating in contact mode generally have a much thinner sacrificial layer. Thus, the ribbon damping is significantly higher, and faster switching and damping speeds are achieved. Unfortunately, because the digital modulator is operated in a "digital" or ON/OFF mode, and intensity attenuation must be performed using pulse-width-modulation techniques—this does not work well with moving media, such as in printing applications.

Hybrid MEMS-Based Spatial Light Modulators

As discussed above, analog MEMS-based SLMs are generally disadvantageous in their reduced damping speeds, while digital MEMS-based SLMs are generally disadvantageous in their need to use PWM for intensity attenuation. Accordingly, there is a need for a device or modulator which has the benefits of both the analog and digital modulators described above while minimizing their detrimental characteristics.

It is further desirable that the modulator have analog capability up to about 50% attenuation for uniformity correction. It is also desirable that the device is capable of operating at a higher voltage to "snap-down" the ribbon into contact to produce a digital "OFF" state.

The present disclosure is directed to a hybrid MEMS-based SLM capable of operating in both analog and digital modes. The hybrid SLM of the present disclosure may be used in numerous applications including, for example, displays, optical networks, maskless lithography, and printing applications, such as high power thermal printing. The hybrid SLM of the present disclosure is a device which has the benefits of both the analog and digital modulators described above while minimizing their detrimental aspects.

If the geometry and dimensions disclosed herein are used, a hybrid modulator may be configured to have analog capability up to about 50% attenuation—this is the type of attenuation that is required for uniformity correction. Moreover, a higher voltage may be applied to "snap-down" the ribbon into contact to produce a digital "OFF" state. Such a hybrid modulator meets the requirements of certain applications, such as high-power thermal printing.

The ON state (0th order) must be continuously variable in order to correct variation due to laser profiles, illumination optics, and MEMs and electronics. Once this correction is established, the circuitry may be configured so as to be able to toggle between this corrected state, and an OFF state—for example, in a digital printing application.

An exemplary embodiment of how this device may be designed and operated is now described in detail with reference to FIGS. 2 through 5. The example used is particularly suited to a high power thermal printing where the laser wavelength is approximately 820 nanometers (~820 nm), and thus a ribbon deflection of approximately 200 nanometers (~200 nm) is required to extinguish the 0th (zero-th) order light.

Figure 2:
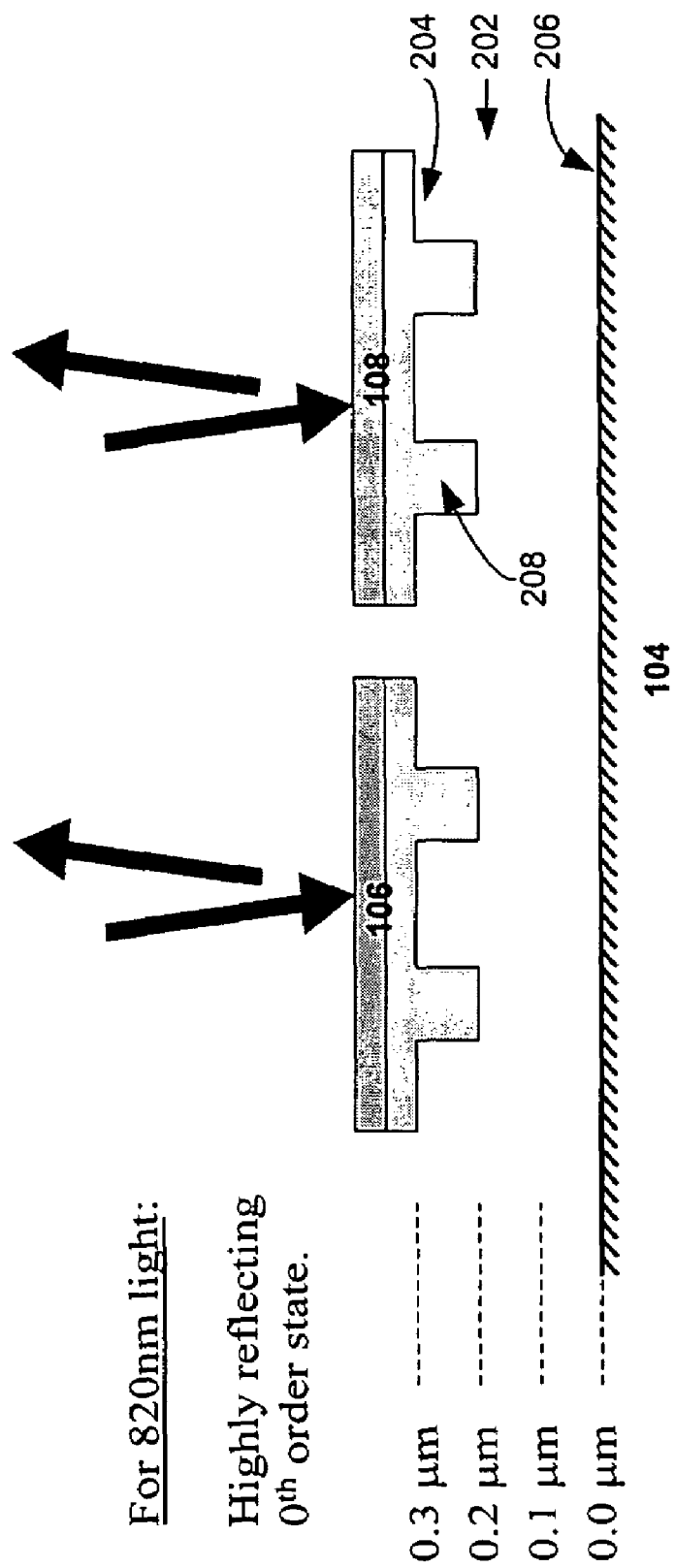
FIG. 2 is a schematic cross sectional view of ribbons for a diffractive SLM according an embodiment of the present invention, operating in 0th order.

FIG. 2 shows a schematic cross sectional view of ribbons for an FLV style SLM, operating in 0th order. By FLV style, it is meant a ribbon type SLM having a number of moving ribbons 108 interlaced with a number of static or reference ribbons 106.

In this example, the sacrificial layer 202, and therefore the separation between a lower surface 204 or underside of the ribbon 108 and an upper surface 206 of the substrate 104, is 0.3 micrometers ($\mu m$). The ribbons 108 further include standoffs 208 on the underside of the ribbon 108 which extend about 1 $\mu m$ towards the substrate 104. These standoffs limit the ribbon deflection to 0.2 $\mu M$ in the event of snap-down. Standoff features under the static ribbons 106 are optional and are not needed. In a different configuration, the standoffs may be located on the substrate, instead of the underside of the ribbon.

Figure 3:
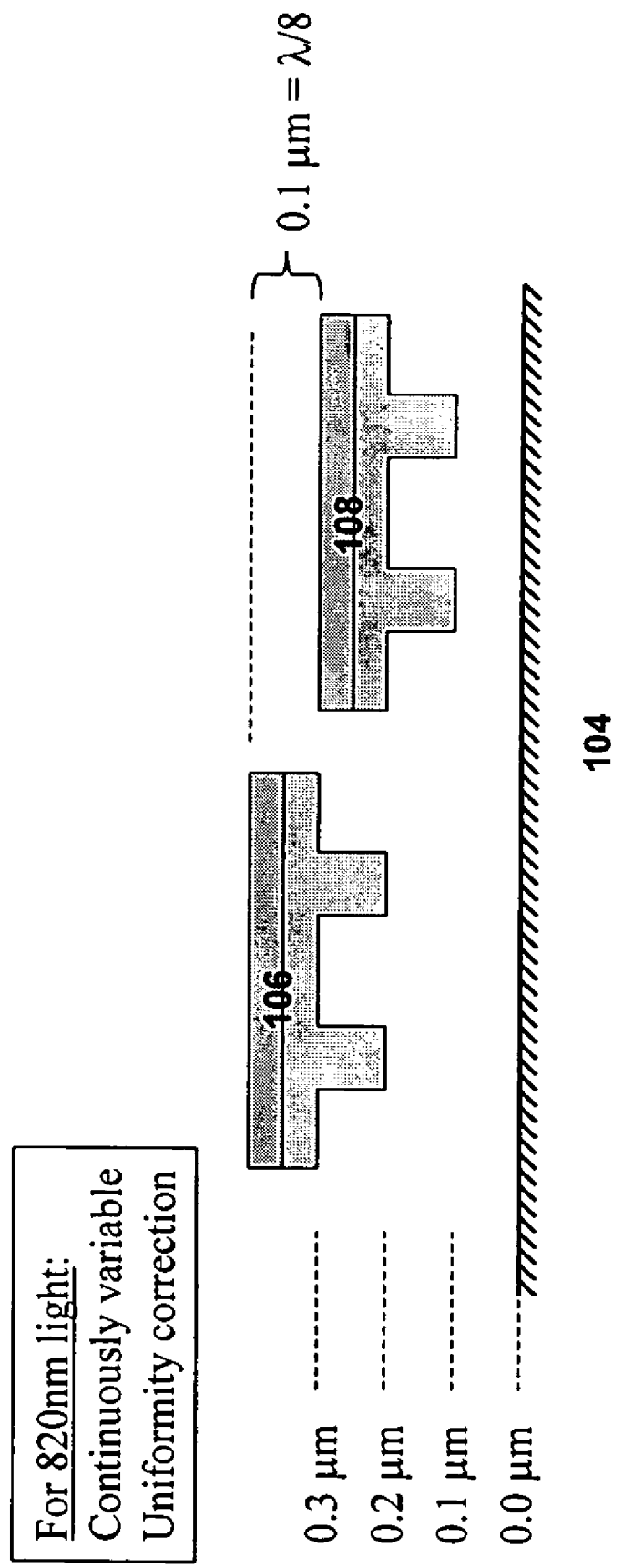
FIG. 3 is a schematic cross sectional view of the device of FIG. 2, with the ribbons deflected to provide 50% attenuation.

In FIG. 2 both ribbons are undeflected, and 0th order light is transmitted at a maximum. With a sacrificial layer of 0.3 $\mu m$, the ribbon 108 may typically be deflected to ⅓ of that value, without snapping to the substrate 104. A deflection of 0.1 $\mu m$ at 820 nm would create diffraction sufficient to reduce the 0th order intensity to 50% relative to the undeflected state. This 50% attenuation state is illustrated in FIG. 3.

Figure 4:
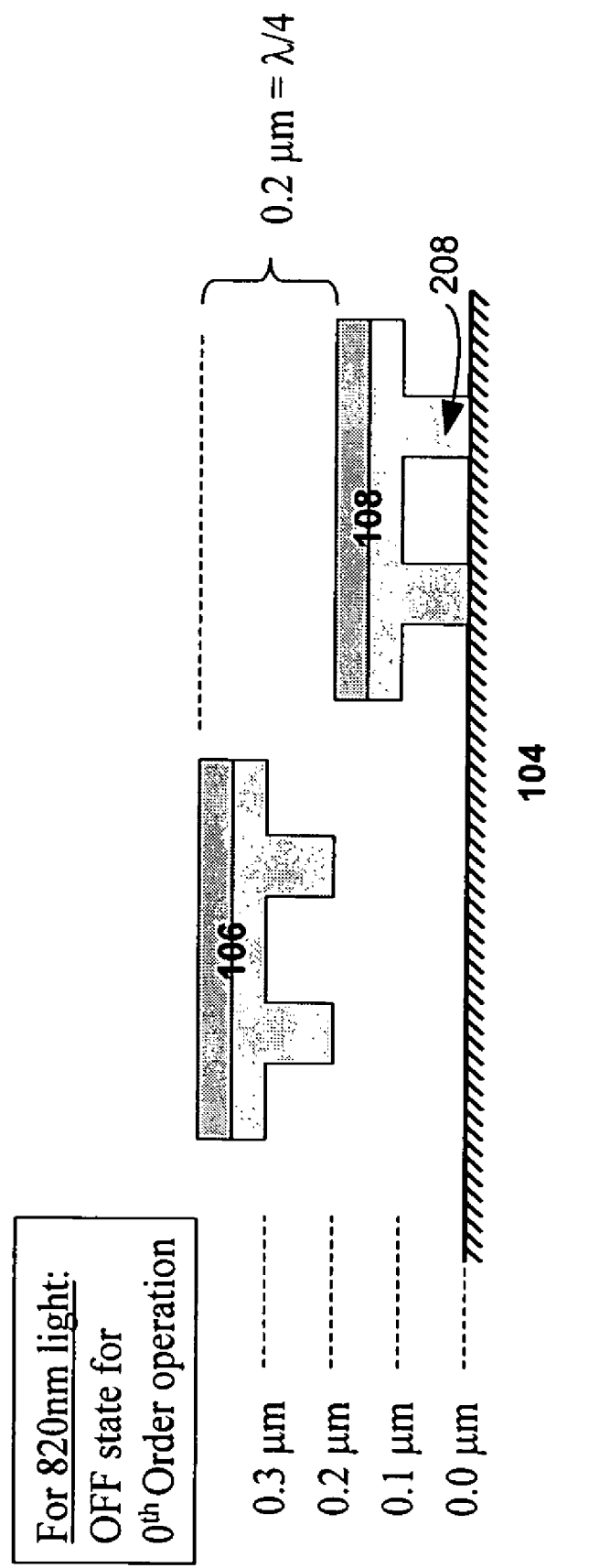
FIG. 4 is a schematic cross sectional view of the device of FIG. 2 in the OFF state.

The deflection up to 0.1 $\mu m$ is continuous and monotonic, and such a deflection may be used for uniformity correction in the thermal printing application. At voltages higher than that needed for 0.1 $\mu m$ deflection, the ribbon will snap to the substrate. This condition is illustrated in FIG. 4. Here, the standoffs 208 limit the deflection to 0.2 $\mu m$, which is precisely the requirement of extinguishing the 0th order light at ~820 nm. In particular, the height difference between the top surface of the undeflected ribbons and the top surface of the deflected ribbons in snap-down is one fourth of the wavelength of the incident light. One quarter of 820 nm is 205 nm or approximately 0.2 $\mu m$. More generally, the height difference between the top surface of the undeflected ribbons and the top surface of the deflected ribbons in snap-down may be an odd multiple of one fourth of the wavelength of the incident light.

Figure 5:
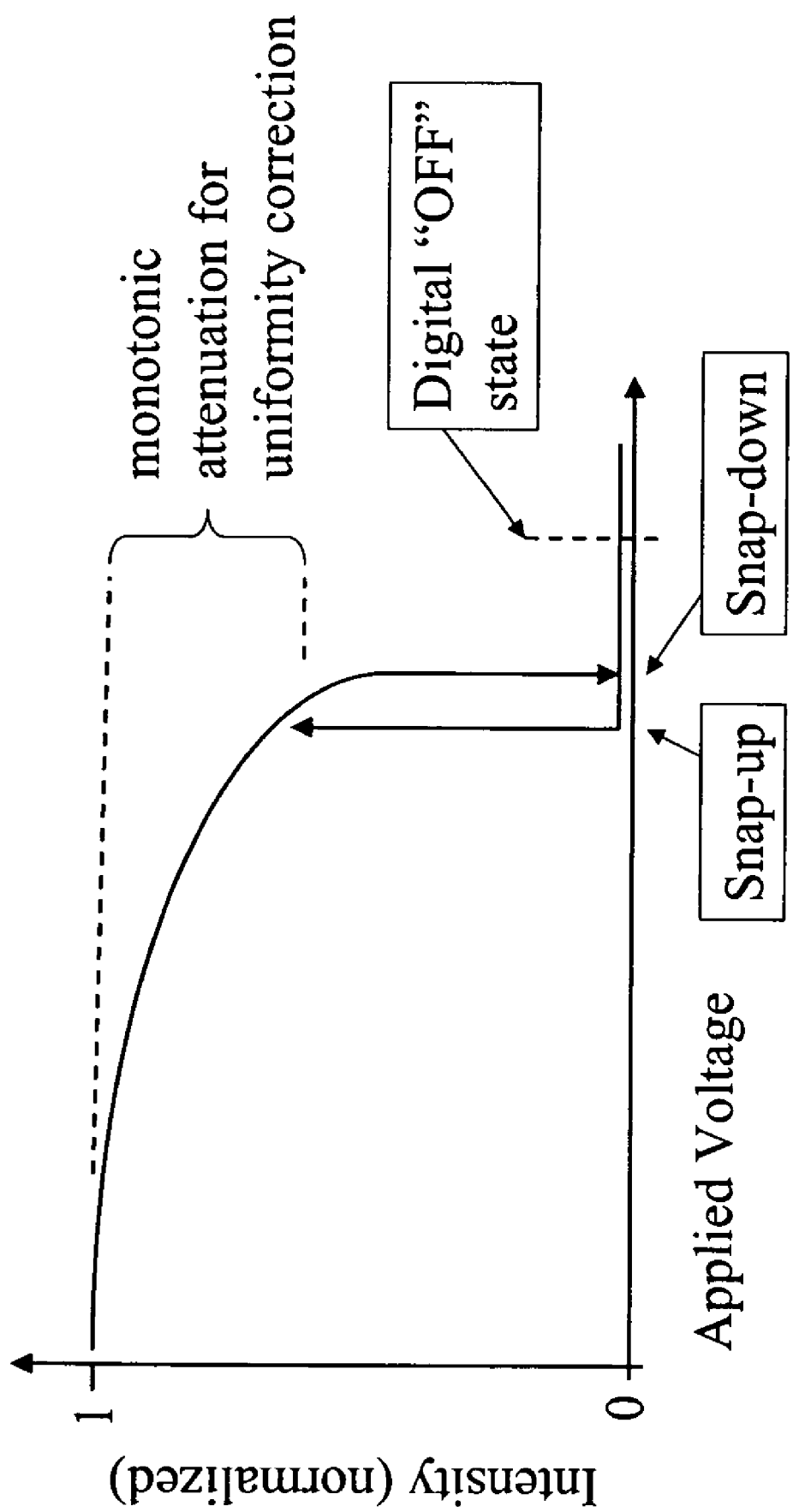
FIG. 5 is a graph of projected intensity-voltage characteristic for the device of FIG. 2.

A graph of the expected intensity-voltage (IV) characteristic is shown in FIG. 5. Lower voltages are used to attenuate the 0th order intensity. A step increase in voltage is then used to snap the ribbon down into contact, and into the OFF state. A contact device has intrinsic hysteresis in the IV characteristic due to the electromechanical instability. However, for the large standoffs, this hysteresis is small, and the device is never operated near the snap-down or snap up regions.

Figure 6:
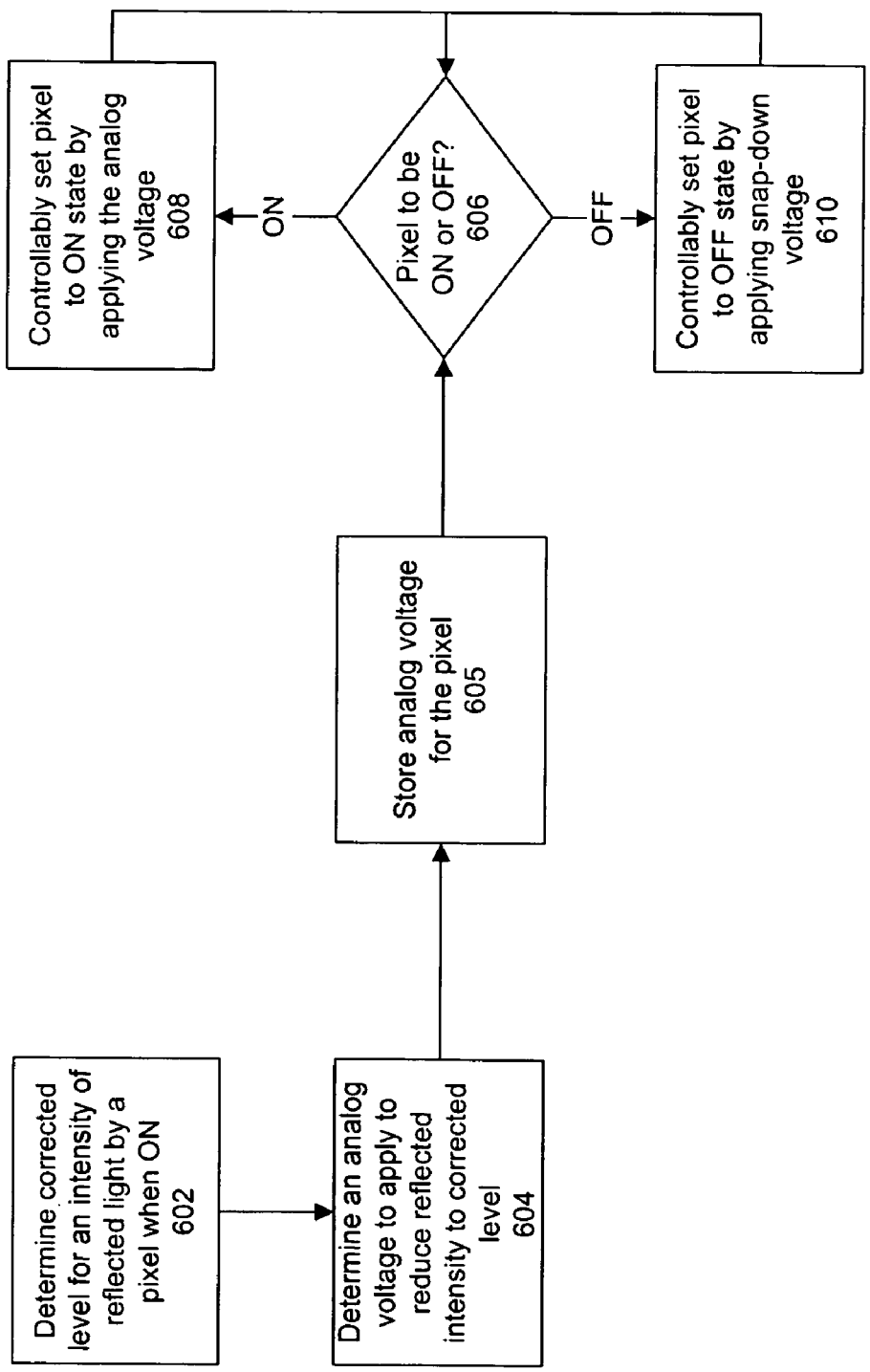
FIG. 6 is a flow chart of a method of operating a pixel of a MEMS based SLM in accordance with an embodiment of the invention.

FIG. 6 is a flow chart of a method of operating a pixel of a MEMS based SLM in accordance with an embodiment of the invention. This method may to each pixel of a MEMS based SLM array.

Per this method, a corrected intensity level may be determined 602 for an intensity of reflected light by a pixel of the MEMS-based SLM when the pixel is in an ON state. In correspondence to this corrected intensity level, an analog voltage is determined 604 to apply between movable ribbons of the pixel and a substrate thereunder. When this analog voltage is applied to the movable ribbons of a pixel and the substrate, the movable ribbons are deflected from an undeflected state by an analog distance so as to reduce the intensity of the reflected light by the pixel to the corrected intensity level.

In a practical implementation, a calibration procedure for the SLM may be used to pre-determine 602 and 604 the corrected intensity level and the corresponding analog voltage per pixel. Thereafter, the analog voltage per pixel in the SLM array may be stored 605 in memory accessible by the SLM driver circuit.

Subsequently, when the SLM pixel array is being operated, a determination 606 may be periodically (for example, once per image frame or once per refresh period) made as to whether the pixel is to be ON or OFF. In other words, is the pixel to be in a state where it constructively reflects light (ON) or in a state where it destructively diffracts light (OFF).

If the pixel is to be in an ON state, then that particular pixel is controllably driven 608 by its corresponding predetermined analog voltage. In other words, the corresponding analog voltage is applied 608 to that pixel so as to achieve a pixel reflecting the corrected intensity level.

If the pixel is to be in an OFF state, then that particular pixel is controllably driven 610 to the snap-down voltage. In other words, a voltage difference sufficient to snap down the movable ribbons is applied 608 to that pixel so as to achieve a pixel which destructively diffracts light. More particularly, the snap-down voltage deflects a top surface of the movable ribbons to a predetermined height above a top surface of the substrate, where the predetermined height may be determined by stand-off features between the ribbons and the substrate.

Figure 7:
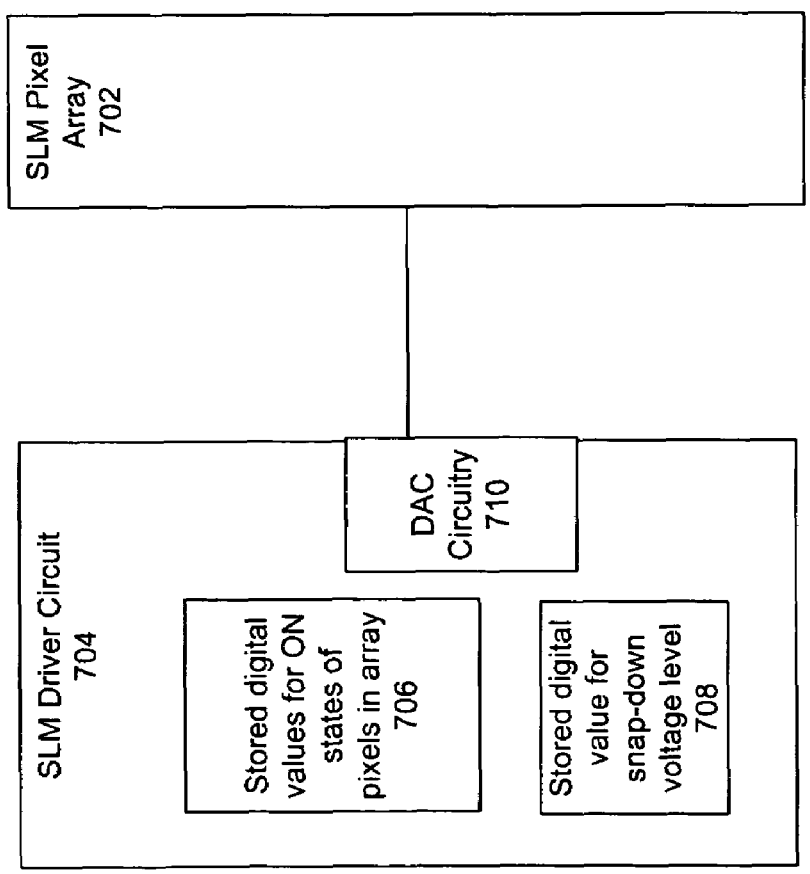
FIG. 7 is a schematic diagram of an apparatus in accordance with an embodiment of the invention The use of the same reference label in different drawings indicates the same or like components. Drawings are not necessarily to scale unless otherwise noted.

FIG. 7 is a schematic diagram of an apparatus in accordance with an embodiment of the invention. The apparatus includes a MEMS based SLM pixel array 702. For example, the array 702 may comprise GLV™ pixels. The SLM pixel array 702 is controllably driven by an SLM driver circuit 704.

The SLM driver circuit 704 may include accessible data storage. The accessible data storage may include, for example, semiconductor memory configured as one or more look-up tables.

In accordance with one embodiment, the data storage includes a look-up table or other data structure 706 which stores digital values (or digital approximations) of the analog voltage levels for the ON states of the pixels in the array 702. In other words, the driver circuit 704 is able to access, for each pixel, a digital value which indicates the analog voltage level which should be driven for that pixel to achieve the corrected intensity level of its ON state. Digital-to-analog conversion (DAC) circuitry 710 in the driver circuit 704 may be used to convert the digital value to an analog voltage level.

In addition, the snap-down voltage level may also be stored as a digital value 708 in the driver circuit 704. DAC circuitry 710 in the driver circuit 704 may also be used to convert the digital value to an analog voltage level.

The advantages of the above-disclosed technique over previous or conventional SLMs include the ability to reduce the thickness of the sacrificial layer to be about one third (⅓) that of the prior art devices, thereby reducing the thermal resistance by about ⅓, leading to either a low ribbon temperature and longer lifetime, or to a much higher power handling capability. Potentially, the power handling capability can be increased by as much as a factor of three (3).

The thinner sacrificial layer also leads to higher damping, which can lead to faster switching speeds. The expected improvement in damping is the sacrificial layer thickness ratio to the 3rd power—in this case, as much as 27 times. The thinner sacrificial allows for lower operating voltages at the same ribbon length, or, shorter (i.e. faster) ribbons operating at a similar voltage. Finally, it should be noted that a thinner sacrificial layer is generally more manufacturable than a thicker one.

Also the device can be operated to as much as fifty percent (50%) attenuation in a continuously variable manner, and the device is also compatible for standard pulse-width-modulation techniques for grayscale control as well.

An additional advantage is that operation in the region near snap-down, which is the most sensitive to charging or electronics drifts, is avoided. The OFF-state is in contact with the substrate and thus is independent of charging for medium amounts of charging.

Although the invention has been described with reference to the FLV embodiment, it will be appreciated that the structure and design technique of the present invention can work equally well with a GLV™-style device, i.e., one having only moving ribbons supported above a reflective surface of the substrate with an approximately equal reflective area. It will also be appreciated that the above described embodiment is but one example of sacrificial thickness and standoff size given for illustrative means. Depending upon an attenuation budget needed for uniformity correction, other values of sacrificial and standoffs may offer optimum performance.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method of operating a micro electromechanical systems (MEMS) based spatial light modulator (SLM), the method comprising:

determining a corrected level for an intensity of reflected light by a pixel of the MEMS-based SLM when the pixel is in an ON state;

determining an analog voltage to apply between movable ribbons of the pixel and a substrate thereunder such that the movable ribbons are deflected from an undeflected state by an analog distance so as to reduce the intensity of the reflected light by the pixel to the corrected level wherein the movable ribbons deflect between a first position spaced from and substantially parallel to the substrate to a second position adjacent the substrate;

controllably setting the pixel in the ON state by applying the analog voltage between the movable ribbons and the substrate; and controllably setting the pixel in an OFF state by applying a snap-down voltage between the movable ribbons and the substrate thereunder, wherein applying the snap-down voltage causes the movable ribbons to undergo a snap-down motion so as to rapidly deflect a top surface of the movable ribbons to a predetermined height provided by standoffs above a top surface of the substrate, the predetermined height less than ⅔ a distance separating the lower surface of the movable ribbons in an unmoved position from the top surface of the substrate and such that a height difference between a ribbon in the undeflected state and a ribbon in the OFF state is approximately an odd multiple of one-quarter of a wavelength of incident light, wherein the standoffs are positioned on a lower surface of the movable ribbons facing towards the top surface of the substrate; and controllably operating the pixel in grayscale mode by applying voltage between the movable ribbons and the substrate to attenuate intensity level of light reflected by the SLM by up to fifty percent (50%).

2. The method of claim 1, wherein the predetermined height is determined by a thickness of the ribbons and a height of standoff features between the ribbons and the substrate.

3. The method of claim 1, wherein each pixel comprises the movable ribbons separated by static ribbons in the undeflected state.

4. The method of claim 1, wherein each pixel comprises the movable ribbons in either the ON or OFF state separated by other movable ribbons in the undeflected state.

5. A micro electromechanical systems (MEMS) based spatial light modulator (SLM), the SLM comprising:
   circuitry for controllably setting the pixel in the ON state by applying an analog voltage between a number of movable ribbons movable ribbons disposed above a top surface of a substrate and the substrate such that the movable ribbons are deflected from an undeflected state so as to reduce the intensity of the reflected light by the pixel to a corrected level wherein the movable ribbons deflect between a first position spaced from and substantially parallel to the substrate to a second position adjacent the substrate;
   circuitry for controllably setting the pixel in an OFF state by applying a snap-down voltage between the movable ribbons and the substrate thereunder, wherein applying the snap-down voltage causes the movable ribbons to undergo a snap-down motion so as to rapidly deflect a top surface of the movable ribbons to a predetermined height provided by standoffs above the top surface of the substrate, the predetermined height less than ⅔ a distance separating the lower surface of the movable ribbons in an unmoved position from the top surface of the substrate and such that a height difference between a ribbon in the undeflected state and a ribbon in the OFF state is approximately an odd multiple of one-quarter of a wavelength of incident light wherein the standoffs are positioned on a lower surface of the movable ribbons facing towards the top surface of the substrate; and
   circuitry for controllably operating the pixel in a grayscale mode to attenuate intensity level of light reflected by the pixel by up to fifty percent (50%).

6. The SLM of claim 5, wherein the predetermined height is determined by a thickness of the ribbons and a height of standoff features between the ribbons and the substrate.

7. The SLM of claim 5, wherein each pixel comprises the movable ribbons separated by static ribbons in the undeflected state.

8. The SLM of claim 7, wherein each pixel comprises the movable ribbons in either the ON or OFF state separated by other movable ribbons in the undeflected state.

9. The SLM of claim 5, wherein the upper surface of the substrate comprises a reflective surface with a reflective area approximately equal to a total area of the reflective surfaces of the plurality of movable ribbons.

10. A hybrid spatial light modulator (SLM) comprising:
    a substrate having an upper surface;
    a plurality of movable ribbons disposed a predetermined distance above the upper surface of the substrate, each of the plurality of movable ribbons having a light reflective surface formed on an upper surface facing away from the upper surface of the substrate and a number of standoffs integrally formed on a lower surface facing towards the upper surface of the substrate,
    a driver circuit configured to operate the SLM in:
       an analog mode in which an analog voltage is applied between the substrate and as least one of the plurality of movable ribbons to deflect the ribbon toward the upper surface of the substrate to attenuate intensity level of light reflected by the SLM by up to fifty percent (50%) to provide a corrected first intensity level of light reflected by the SLM in a first state; and
       a digital mode in which a snap-down voltage is applied between the substrate and a number of the plurality of movable ribbons to cause the movable ribbons to rapidly deflect to the predetermined height provided by standoffs to provide a predetermined second intensity level of light reflected by the SLM in a second state; and
    wherein the plurality of standoffs have a predetermined height less than ⅔ a distance separating the lower surface of the movable ribbons in an unmoved position from the surface of the substrate, and wherein the predetermined height and the distance separating the lower surface of the movable ribbons in an unmoved position from the surface of the substrate are selected in relation to a wavelength ($\lambda$) of light incident on the SLM so that the reflective surface of a ribbon in the first position is separated from the reflective surface of a ribbon in the second position by a distance of $n \cdot \lambda / 4$, where n is an odd whole number greater than 1.

11. The hybrid SLM according to claim 10, wherein the upper surface of the substrate comprises a reflective surface with a reflective area approximately equal to a total area of the reflective surfaces of the plurality of movable ribbons.

12. The hybrid SLM according to claim 11, wherein in the distance separating the lower surface of the movable ribbons from the substrate surface in the first state is selected so that the SLM in the first state is in a reflective or ON state, and in the second state is in a non-reflective or OFF state.

13. The hybrid SLM according to claim 11, wherein in the distance separating the lower surface of the movable ribbons from the substrate surface in the first state is selected so that the SLM in the first state is in a non-reflective or OFF state, and in the second state is in a reflective or ON state.

14. The hybrid SLM according to claim 10, wherein the plurality of standoffs have a predetermined height that enables the movable ribbons to move a distance of at least ⅔ the distance separating the lower surface of the movable ribbons in an unmoved position from the surface of the substrate.

* * * * *